United States Patent
Gorantla et al.

(10) Patent No.: US 10,097,634 B1
(45) Date of Patent: Oct. 9, 2018

(54) STORAGE TIER SELECTION FOR REPLICATION AND RECOVERY

(71) Applicant: Veritas Technologies LLC, Mountain View, CA (US)

(72) Inventors: Hrudil Gorantla, Guntur (IN); Subhadeep Ghosh, Kolkata (IN); Sunil Hasbe, Shirur Anantpal (IN); Subash Rajaa, Pune (IN)

(73) Assignee: Veritas Technologies, LLC, Mountain View, CA (US)

(*) Notice: Subject to any disclaimer, the term of this patent is extended or adjusted under 35 U.S.C. 154(b) by 170 days.

(21) Appl. No.: 15/142,466

(22) Filed: Apr. 29, 2016

(51) Int. Cl.
  *G06F 15/16* (2006.01)
  *H04L 29/08* (2006.01)
  *H04L 12/24* (2006.01)

(52) U.S. Cl.
  CPC ...... *H04L 67/1095* (2013.01); *H04L 41/5019* (2013.01); *H04L 67/1097* (2013.01)

(58) Field of Classification Search
  CPC ..... H04L 29/08; H04L 12/24; H04L 67/1095; H04L 67/1097; H04L 41/5019
  See application file for complete search history.

(56) References Cited

U.S. PATENT DOCUMENTS

| | | | | |
|---|---|---|---|---|
| 9,529,545 B1* | 12/2016 | Bono | | G06F 3/0641 |
| 2012/0221787 A1* | 8/2012 | Fuente | | G06F 3/0607 |
| | | | | 711/112 |
| 2013/0036091 A1* | 2/2013 | Provenzano | | G06F 17/30162 |
| | | | | 707/624 |
| 2013/0145095 A1* | 6/2013 | McKean | | G06F 12/0804 |
| | | | | 711/122 |

* cited by examiner

*Primary Examiner* — June Sison
*Assistant Examiner* — Steven Nguyen
(74) *Attorney, Agent, or Firm* — Campbell Stephenson LLP

(57) ABSTRACT

Disclosed herein are methods, systems, and processes to select storage tiers for data replication and data recovery. A replication stream is received from a replication appliance that is configured to replicate data to a storage tier of multiple storage tiers. Each storage tier differs from at least one other storage tier in at least one storage characteristic. Portions of the replication stream are identified based on input/output (I/O) characteristics. The portions are stored in one storage tier other than the storage tier based on the I/O characteristics, and a storage cost associated with each storage tier, where the storage cost associated with each storage tier is based on storage characteristics of each storage tier.

21 Claims, 14 Drawing Sheets

| Replication Stream Field 310 | I/O Rate Field 315 | I/O Size Field 320 | Locality Field 325 | Original Storage Tier Field 330 | Storage Cost Field 335 | Storage Performance Field 340 | New Storage Tier Field 345 |
|---|---|---|---|---|---|---|---|
| Replication Stream 120(1) | 10 mb/s | 1 mb | Object 230(1) | Storage Tier 155(1) | High | High | Storage Tier 155(2) |
| Replication Stream 120(2) | 20 mb/s | 2 mb | Object 230(2) | Storage Tier 155(2) | Low | Low | Storage Tier 155(1) |
| Replication Stream 120(3) | 50 mb/s | 0.5 mb | Chunk 250(1) | Storage Tier 155(3) | High | Low | Storage Tier 155(5) |
| ••• | ••• | ••• | ••• | ••• | ••• | ••• | ••• |
| Replication Stream 120(N) | 100 mb/s | 10 mb | Chunk 250(N) | Storage Tier 155(4) | Low | High | Storage Tier 155(N) |

Replication Management Table 305

FIG. 3A

STORAGE TIER SELECTION FOR REPLICATION AND RECOVERY

FIELD OF THE DISCLOSURE

The present disclosure relates to data replication and data recovery and, more particularly, to storage tier selection for data replication and data recovery.

DESCRIPTION OF THE RELATED ART

Appliances can be hardware devices with integrated software or virtual devices (e.g., pre-configured virtual machine images created by installing software appliances on virtual machines). Appliances can be designed and configured to perform replication operations. Data replication involves replicating data associated with application input/output (I/O) operations over a network to remote sites, making the replicated data available for processing (e.g., during data backup, disaster recovery, data mining, or the like). In certain replication environments, I/Os from an application or operating system are continuously tapped and transmitted to a first appliance. The first appliance then replicates the received data to a second appliance residing on a remote site (e.g., a data center, a cloud, or the like).

Several companies (e.g., cloud vendors, and the like) provide disaster recovery services to organizations, other companies, and individuals. However, storing data in the cloud incurs significant storage-related costs. For example, multiple cloud vendors can each provide multiple storage tiers, where each storage tier can involve different financial costs to replicate data to that storage tier. In such a situation, selecting the wrong storage tier for data replication can increase the financial costs of a company's disaster recovery plan. In addition, changes in replication workloads may also require a company to reevaluate the continued use a previously-selected storage tier, or risk redundant storage-related monetary expenses.

SUMMARY OF THE DISCLOSURE

Disclosed herein are methods, systems, and processes to select storage tiers in data replication and data recovery environments. One such method involves receiving a replication stream from a replication appliance. The replication appliance is configured to replicate data to a storage tier of multiple storage tiers. In this example, each storage tier differs from at least one other storage tier in at least one storage characteristic.

In some embodiments, the method identifies portions of the replication stream based on one or more input/output (I/O) characteristics of the portions of the replication stream, and stores the portions in one storage tier (of the multiple storage tiers) other than the storage tier. In this example, the storing is performed based on I/O characteristics of the portion, and a storage cost associated with each storage tier. The storage cost associated with each storage tier is based on storage characteristics of each storage tier.

In other embodiments, the storage tiers include multiple storage types, storage systems, and/or storage devices. The replication stream is received by a target replication appliance, and the storage tiers are associated with the target replication appliance. The method sends reconfiguration instructions to the replication appliance to replicate data to at least one of the storage tiers other than the storage tier.

In certain embodiments, the method stores a first portion of the replication stream to a first of the storage tiers other than the storage tier, and stores a second portion of the replication stream to a second of the storage tiers other than the storage tier. In this example, the I/O characteristics associated with the replication stream include an I/O rate, a size of an I/O, or a locality of reference. The storage tiers include block storage devices and object storage devices.

In one embodiment, a Service Level Agreement (SLA) is associated with the replication stream. The SLA includes multiple constraints, including a Recovery Point Objective (RPO) and a Recovery Time Objective (RTO) associated with the replication stream. The storage characteristics and the I/O characteristics are not exclusive of one another (but can be).

In another embodiment, the method determines whether the RPO and the RTO require the storing of the one or more portions in a first one of the storage tiers other than the storage tier even if the storage cost associated with the first one of storage tiers is higher than the storage cost of the storage tier.

In certain embodiments, the method determines whether a given number of virtual machines can be supported by each storage tier. In this example, the determining is based on a number of disks that can be coupled to a cloud gateway, a maximum data size on a Local Area Network (LAN), and an I/O rate of each virtual machine. The method also calculates the storage cost of replicating another replication stream received from the virtual machine based on an average I/O rate of the virtual machines.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 3A is a replication management table for performing storage tier-based data replication, according to one embodiment of the present disclosure.

Figure 1A:
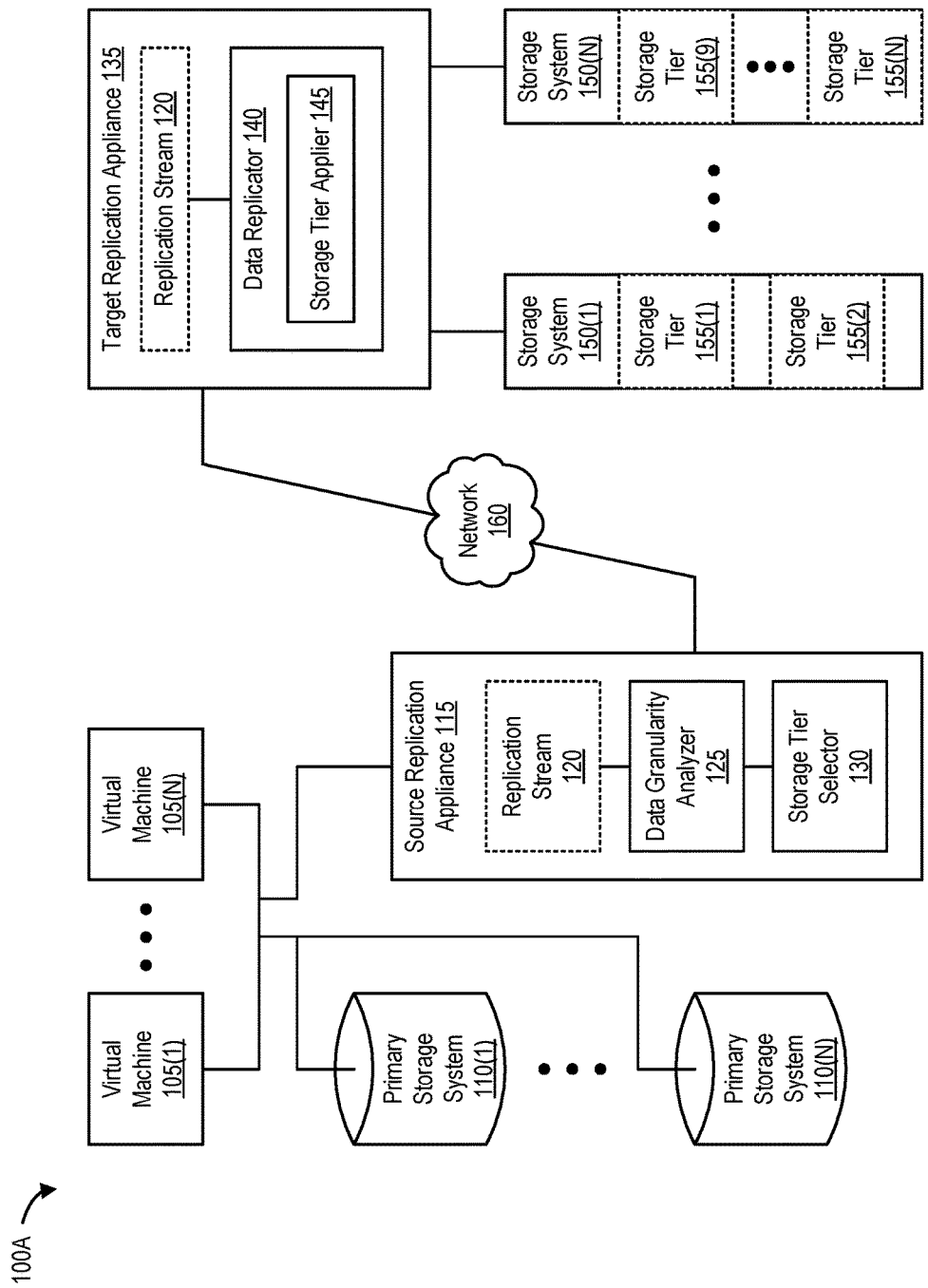
FIG. 1A is a block diagram of a data replication system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Cloud storage is a simple and scalable way to store, access, and share data over a network (e.g., the Internet). Cloud storage providers typically own and maintain the network-connected hardware and software, while customers provision and use the data they need (e.g., via a web application). Using cloud storage eliminates the acquisition and management costs of buying and maintaining storage infrastructure, increases agility, provides global scale, and delivers "anywhere, anytime" access to data.

Cloud vendors provide different types of storage (also referred to herein as storage tiers). For example, one or more cloud vendors can provide object storage and/or block storage. Object storage is a storage architecture that manages data as objects (e.g., as opposed to other storage architectures like file systems which manage data as a file hierarchy). Each object typically includes the data itself, metadata, and a unique identifier. Object storage can be implemented at multiple levels, including the device level (e.g., object storage device), the system level, and the interface level. In each case, object storage can enable capabilities not addressed by other storage architectures, like interfaces that can be directly programmable by the application, a namespace that can span multiple instances of physical hardware, and data management functions like data replication and data recovery at object-level granularity. Therefore, object storage systems allow relatively inexpensive and scalable retention of large amounts of unstructured data (e.g., for posting photographs to a social media website, uploading songs to a music streaming service, online collaboration services, and the like).

Block storage is a type of data storage typically used in storage-area network (SAN) environments where data is stored in volumes, also referred to as blocks. Each block operates like an individual hard drive and can be configured by a storage administrator. Blocks can be controlled by using an operating system (OS), and can be accessed using protocols such as Fibre Channel (FC), Small Computer System Interface (SCSI), and the like. Because volumes are treated as individual hard disks, block storage works well for storing a variety of applications such as file systems and databases. While block storage devices tend to be more complex and expensive than file storage or object storage, they also tend to be more flexible and provide better performance.

Therefore, different storage tiers implemented using storage devices of different types are suitable for storing specific types of data, and provide varied performance capabilities and cost-related concerns. Because object storage operates like an infinite storage pool for infrequent data access (e.g., once written, data is read-only), object storage is unsuitable and cost prohibitive for frequently modified data. On the other hand, block storage is suitable for frequently modified data. For example, a database application (where data is modified frequently) can use block storage, and a web server (that serves read-only images and/or files) can use object storage. However, as previously noted, the monetary cost of object storage is significantly different than block storage.

Traditional replication systems typically use block storage tiers for protecting on premise virtual machines in cloud environments. However, treating (and storing) data in the same manner when multiple different types of storage devices (e.g., object, block, and the like) are available can result in over-capacity (e.g., redundancy, available storage, performance, and the like) with respect to storage-related resources. For example, a storage tier initially selected for data replication may not continue to provide the best storage cost and/or performance when other constraints (e.g., as part of a Service Level Agreement (SLA)) are taken into consideration. In addition, if a workload profile of a virtual machine changes over time, the continued use of a storage tier initially selected for data replication may have to be reevaluated to reduce (or eliminate) redundant storage-related monetary expenses.

Disclosed herein are methods, systems, and processes to leverage storage characteristics of storage tiers as well as characteristics of a replication stream, to reduce (or minimize) the cost of data replication in cloud environments. It will be appreciated that these methods, systems, and processes can also leverage different storage tiers provided by various cloud vendors to reduce the cost of data replication and data recovery operations.

Examples of Storage Tier Selection-Based Replication Systems

FIG. 1A is a block diagram of a data replication system, according to one embodiment. The data replication (and recovery) system of FIG. 1A includes virtual machines 105(1)-(N), a source replication appliance 115, a target replication appliance 135, and storage systems 150(1)-(N) communicatively coupled to each other via network 160. Network 160 can include any type of network or interconnection (e.g., the Internet, a Wide Area Network (WAN), a Storage Area Network (SAN), and the like).

Virtual machines 105(1)-(N) are communicatively coupled to primary storage systems 110(1)-(N) (in which virtual disks (not shown) can be maintained). In one embodiment, primary storage systems 110(1)-(N) include one or more virtual disks. In other embodiments, primary storage systems 110(1)-(N) can include one or more of a variety of different storage devices, including hard disks, compact discs, digital versatile discs, one or more solid state drives (SSDs), memory such as Flash memory, and the like, or one or more logical storage devices, and the like, or one or more logical storage devices such as volumes implemented on one or more such physical storage devices.

Source replication appliance 115 includes a replication stream 120 (e.g., received from virtual machine 105(1)), a data granularity analyzer 125, and a storage tier selector 130. Data granularity analyzer 125 analyzes the granularity of data in replication stream 120. For example, data granularity analyzer 125 can determine the number and the location of blocks, chunks, and/or objects (or other units of data) that are part of replication stream 120. Storage tier selector 130 identifies one or more storage tiers on which one or more blocks and/or objects can be stored (e.g., to minimize or reduce storage-related monetary costs).

Target replication appliance 135 includes replication stream 120 (e.g., received from source replication appliance 115), and a data replicator 140. Data replicator 140 includes a storage tier applier 145. Storage tier applier 145 ensures that data (e.g., in the form of blocks, objects, or other form) is stored (e.g., replicated using data replicator 140) on a storage tier that is identified by source replication appliance 115. Both source replication appliance 115 and/or target replication appliance 135 can be configured with hardware and/or software to enable them to function as clients and/or servers. An end user of source replication appliance 115 and/or target replication appliance 135 need not understand the technical details of the underlying OS running on source replication appliance 115 and/or target replication appliance 135, because the hardware and/or software is preconfigured (e.g., by a manufacturer) and unmodifiable.

In some embodiments, source replication appliance 115 and/or target replication appliance 135 are discrete hardware devices with integrated software (e.g., firmware). Source replication appliance 115 and/or target replication appliance 135 can also be virtual appliances. Virtual appliances are configured to provide similar functionality as dedicated hardware appliances, but virtual appliances are distributed (e.g., to customers), as software virtual machine images in a hypervisor, or for a hypervisor-enabled device. In addition, customers can deploy source replication appliance 115 and/or target replication appliance 135 by integrating the software (e.g., OS software) and the hardware of a computing device.

Source replication appliance 115 and target replication appliance 135 have exactly one combination of hardware, OS, and application software (e.g., data replication software). Therefore, source replication appliance 115 and/or target replication appliance 135 can be deployed and managed by customers without extensive technical knowledge. Once deployed however, source replication appliance 115 and/or target replication appliance 135 do not permit (and are not designed to allow) customers to change (or modify) the software (e.g., OS software). Therefore, source replication appliance 115 and/or target replication appliance 135 are designed to be secure "black boxes" for customers (securely providing replication functionality).

The data replication system of FIG. 1A also includes storage systems 150(1)-(N). For example, storage system 150(1) includes storage tiers 155(1) and 155(2), and storage system 150(N) includes storage tiers 155(3)-(N). It should be noted that different storage tiers may be on different kinds of storage devices (e.g., a block can be stored on a SSD, and an object can be stored on a Hard Disk Drive (HDD)). In this example, storage tier 155(1) can be a SSD and storage tier 155(2) can be a HDD. Therefore, each storage system of storage systems 150(1)-(N) can include multiple storage tiers, and each storage tier can be implemented using a different type of storage device. It should be noted that storage tiers 155(1)-(N) can include one or more of a variety of different types of storage devices, including, but not limited to, object storage devices, block storage devices, file storage devices, and/or the like, implemented using hard disks, compact discs, digital versatile discs, one or more SSDs, memory such as Flash memory, and the like, or one or more logical storage devices, and the like, or one or more logical storage devices such as volumes implemented on one or more such physical storage devices.

Figure 1B:
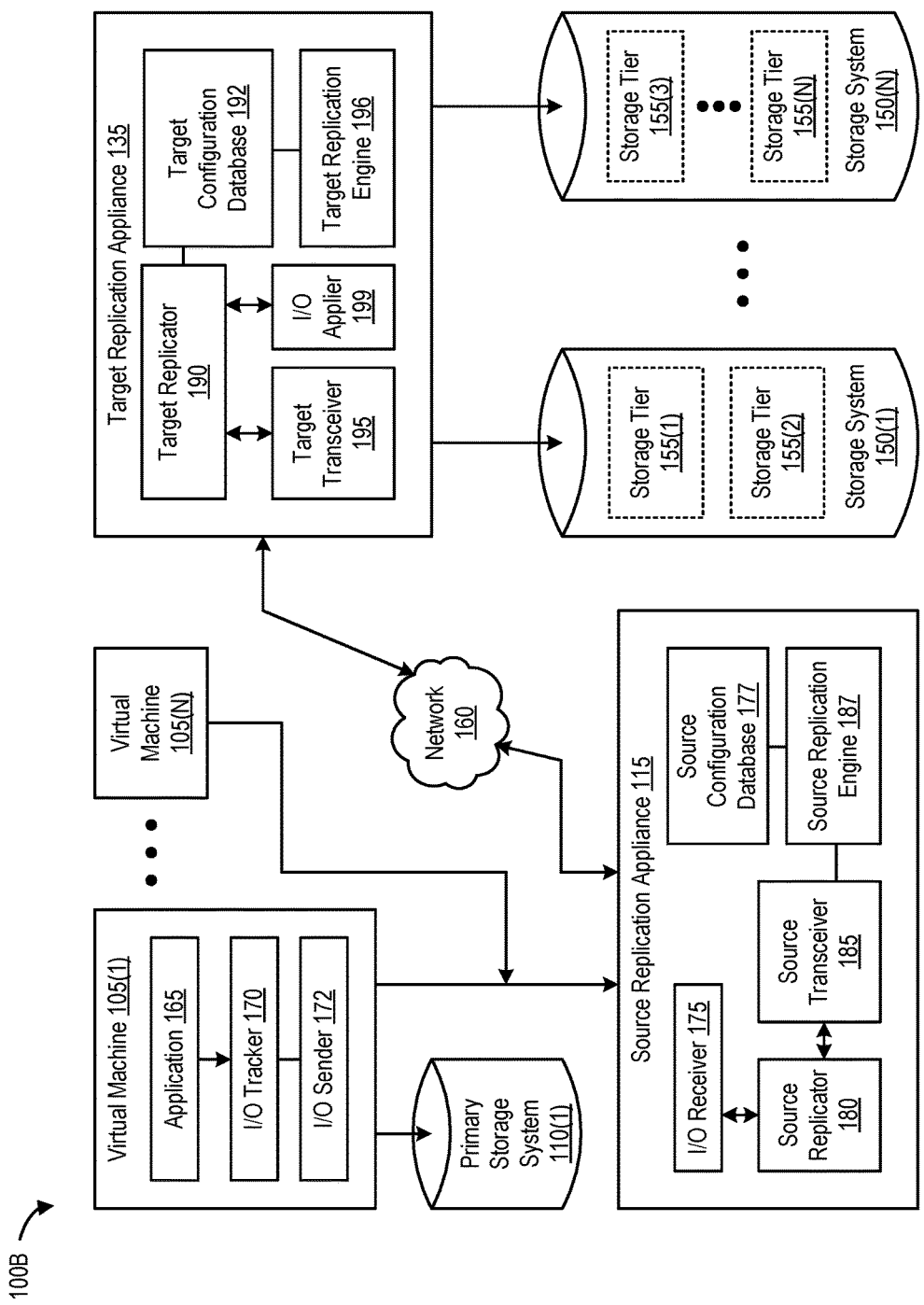
FIG. 1B is a block diagram of a data replication system, according to one embodiment of the present disclosure.

FIG. 1B is a block diagram of a replication system that implements a source replication engine and a target replication engine, according to one embodiment. As shown in FIG. 1B, virtual machine 105(1) includes an application 165. Application 165 generates I/O operations (or simply I/Os) (e.g., read operation(s), write operation(s), and the like) that are identified, managed, and/or tracked by I/O tracker 170. Virtual machine 105(1) also includes I/O sender 172. I/O sender 172 sends (or transmits) I/Os from virtual machine 105(1) (e.g., from primary storage system 110(1)) to source replication appliance 115.

Source replication appliance 115 includes an I/O receiver 175, a source configuration database 177, a source replicator 180, a source transceiver 185, and a source replication engine 187. I/O receiver 175 receives I/Os (e.g., in the form of replication stream 120) from I/O sender 172. Source configuration database 177 maintains information associated with I/Os generated by virtual machine 105(1). By keeping track of the state of I/Os at different points in time, source configuration database 177 allows source replicator 180 to identify specific portions of replication stream 120 (e.g., block(s), chunk(s), object(s), file(s), and the like), and permits source replication engine 187 to generate instructions to replicate one or more such portions to specifically selected and identified storage tiers. Source transceiver 185 sends (or transmits) replication stream 120 (with instructions) to target replication appliance 135, and, in certain embodiments, can also receive data from target replication appliance 135 (e.g., a write confirmation, a notification that a storage tier is no longer available, and the like).

As shown in FIG. 1B, target replication appliance 135 includes a target replicator 190, a target configuration database 192, a target transceiver 195, a target replication engine 196, and an I/O applier 199. Target configuration database 192 maintains information associated with I/Os in replication stream 120 received from source replication appliance 115 (e.g., target transceiver 195 receives replication stream 120 and accompanying instructions (e.g., with storage tier selection) from source transceiver 185). Target replicator 190 accesses specific portions of replication stream 120 identified by source replicator 180 (and received as part of replication stream 120), and target replication engine 196 replicates those one or more portions to one or more storage tiers specifically identified and selected by source replication appliance 115. For example, I/O applier 199 selectively applies I/Os in replication stream 120 (e.g., in the form of blocks, objects, chunks, and the like) to one or more storage tiers identified and selected by source replication appliance 115.

Examples of Performing Selective Storage Tier-Based Replication

Figure 2A:
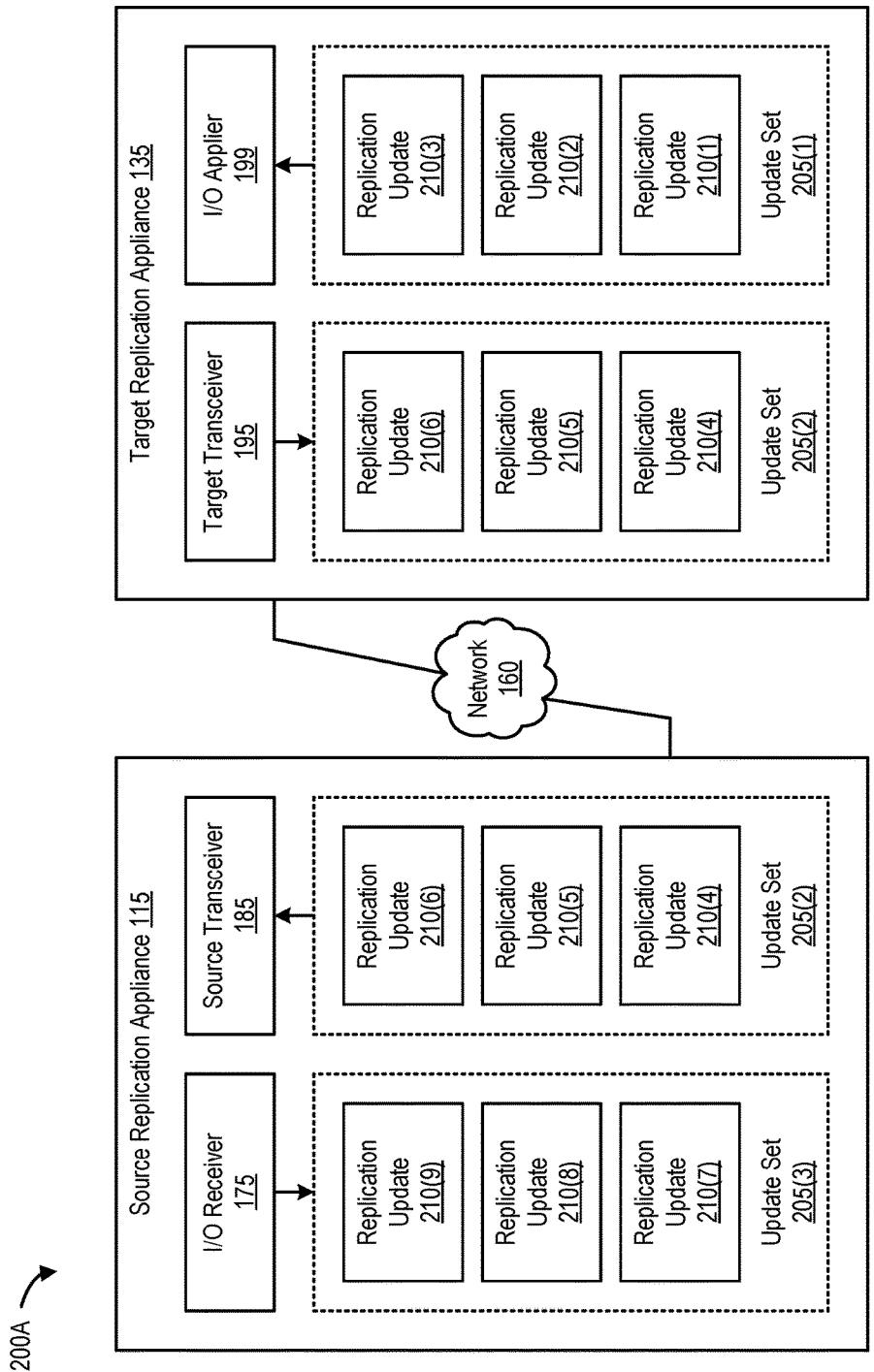
FIG. 2A is a block diagram of a source replication appliance and a target replication appliance, according to one embodiment of the present disclosure.

FIG. 2A is a block diagram of a source replication appliance and a target replication appliance, according to one embodiment. As shown in FIG. 2A, source replication appliance 115 includes I/O receiver 175 and source transceiver 185. As previously noted, I/O receiver 175 receives I/Os (e.g., in the form of replication stream 120) from one or more computing devices (e.g., virtual machines 105(1)-(N)). Source replicator 180 can analyze replication stream 120 to identify one or more update sets (e.g., update sets 205(2) and 205(3)). Update sets each contain one or more replication updates (e.g., replication updates 210(1)-(9)).

In one embodiment, a replication update is a write operation that generates new data that has to be replicated or modifies existing data that has been replicated. However in other embodiments, any modification (or even an access request, for example, a read request) to data previously replicated to storage systems 150(1)-(N) can be considered a replication update. As shown in FIG. 2A, source transceiver 185 transmits (or sends) update sets (with one or more replication updates identified by source replicator 180) to target replication appliance 135.

Target replication appliance 135 includes target transceiver 195 and I/O applier 199. Target transceiver 195 receives update sets from source transceiver 185 and I/O applier 199 applies those replication updates to one or more storage tiers identified by source replication appliance 115. In one embodiment, target replication appliance 135 receives replication stream 120 from source replication appliance 115 (e.g., in the form of update sets). In this example, target replication appliance 135 is configured (e.g., by target replicator 190) to replicate data to a storage tier (out of multiple available storage tiers) (e.g., storage tier 155(1)). It will be appreciated that each storage tier (e.g., storage tier 155(1)) differs from at least one other storage tier (e.g., storage tier 155(3)) in at least one storage characteristic (e.g., storage tier 155(1) can be a SSD and storage tier 155(3) can be a HDD, storage tier 155(1) can be a block storage device and storage tier 155(2) can be an object storage device, and the like).

Source replicator 180 and/or target replicator 190 implemented in source replication appliance 115 and target replication appliance 135, respectively, can identify portions of replication stream 120 (e.g., update sets 205(1), 205(2), and 205(3) as shown in FIG. 2A, for example, can be identified based on information received from I/O tracker 170, and/or from information maintained by source configuration database 177 and/or target configuration database 192 (e.g., because the source configuration database 177 can maintain information or metadata about data that is stored in primary storage system 110(1) and that is part of replication stream 120, whereas target configuration database 192 can maintain information or metadata about data that has been replicated to any one of storage systems 150(1)-(N), and that is also part of replication stream 120).

Source replication engine 187 and/or target replication engine 196 can store the identified portions in one storage tier (out of multiple available storage tiers) other than the storage tier that is configured (e.g., by target replicator 190) to replicate data (e.g., storage tier 155(1)). If new data has to be replicated (e.g., the data does not exist in storage systems 150(1)-(N)), source replication engine 187 can directly store (or replicate) the new data to a storage tier (other than the storage tier that is pre-configured). However, if update sets are involved, modifications to previously replicated data can be performed by target replication engine 196 using I/O applier 199. Because both source replication appliance 115 and target replication appliance 135 implement source transceiver 185 and target transceiver 195 respectively, portions of replication stream 120 can be stored (or replicated) to (and recovered from) a storage tier by either source replication appliance 115 and/or target replication appliance 135. In some embodiments, storing the (identified) portions is performed based on I/O characteristics of the portion (e.g., replication update 210(1)) as well as a storage cost associated with each storage tier. In this example, the storage cost associated with each storage tier is based on the storage characteristics of each storage tier.

Examples of Leveraging Differences Between Storage Tiers

As previously noted, the computing systems of FIGS. 1A, 1B, and 2A can be implemented to (positively) leverage differences between storage tiers (e.g., storage costs and storage performance associated with different storage tiers provided by various cloud vendors, and the like). Also as previously noted, storage cost differences between block storage (high storage cost, for example, for elastic block storage devices) and object storage (low storage cost) can also be leveraged to improve the running cost of a disaster recovery solution.

For example, generally speaking, the storage cost associated with block storage is high and the storage cost associated with object storage is low. However, the I/O cost of block storage is low (e.g., the monetary cost to perform a single read request or write operation), whereas the I/O cost associated with object storage is high. One reason for this disparity may exist because an I/O request (e.g., a read or write operation) of only 256 KB counts as a single I/O operation on block storage, whereas in object storage, an I/O request (e.g., a GET/PUT request) of any size is counted as a single I/O operation (and so, a storage provider must use a cost model that assumes large transfers, as a precaution).

In certain embodiments, the computing systems of FIGS. 1A, 1B, and 2A can leverage the low storage cost associated with object storage, which as a consequence, requires controlling the I/O costs associated with object storage (e.g., the monetary cost associated with GET and PUT requests). Both the I/O cost and the storage cost of block storage and object storage can be considered (e.g., as functions of storage tier cost and I/O cost as they apply to one or more available storage tiers) to select an appropriate storage tier for one or more portions of replication stream 120 (e.g., (Storage Tier, Cost)=f (I/O cost, Storage Cost), among various other possible functions). In this example, the I/O cost of object storage can be reduced by performing I/O consolidation. Therefore, in some embodiments, I/O consolidation can be performed to leverage cheaper object storage while at the same time reducing the cost of more expensive I/O requests associated with object storage.

Figure 2B:
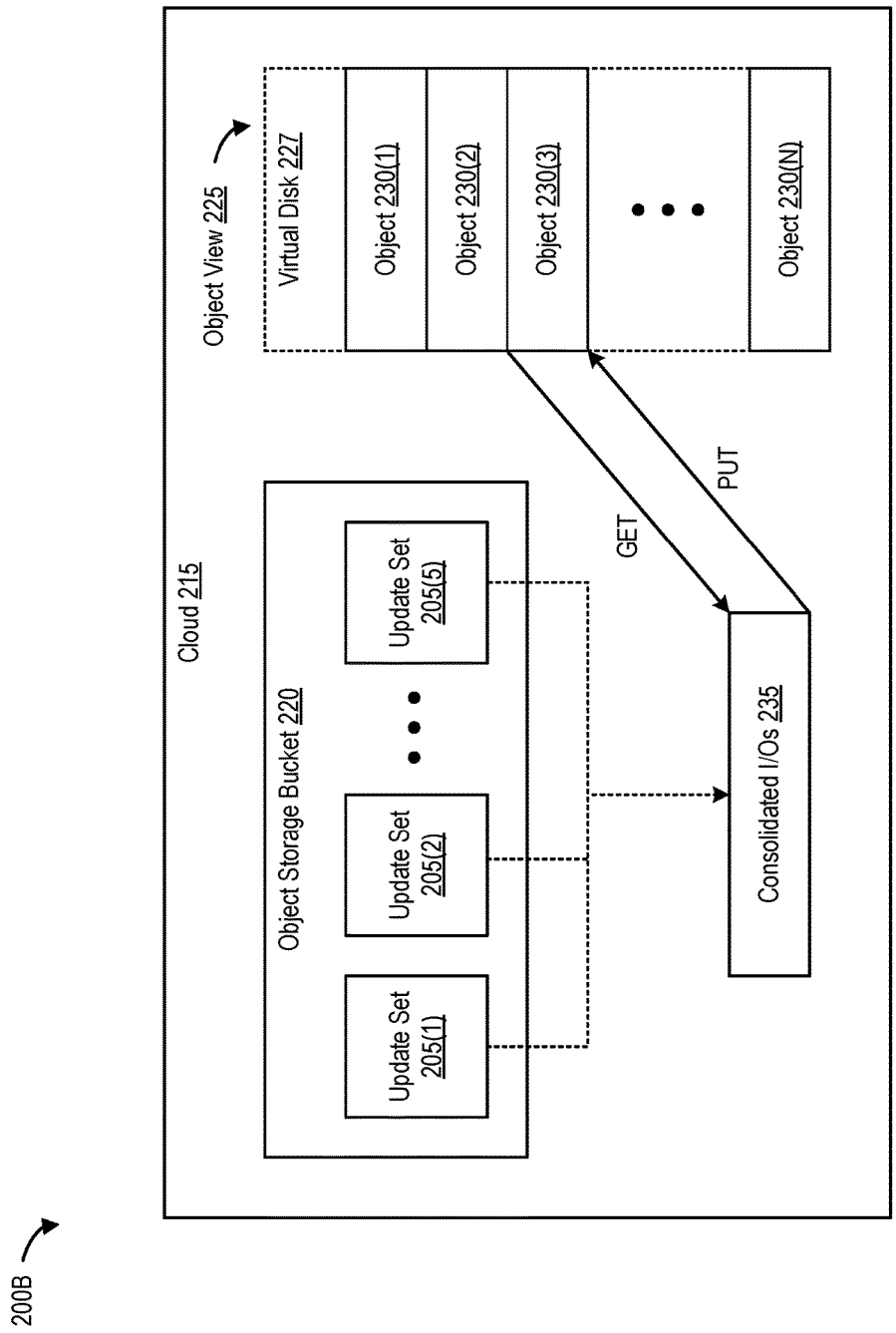
FIG. 2B is a block diagram of an object storage device, according to one embodiment of the present disclosure.

FIG. 2B is a block diagram of an object storage device, according to one embodiment. The object storage device of FIG. 2B is implemented in cloud 215. Cloud 215 includes an object storage bucket 220 (e.g., a storage pool). In object storage, data is represented as block-objects (or simply objects). For example, a 1 GB virtual disk (e.g., virtual disk 227) can be divided into 100 block-objects of 10 MB each (e.g., objects 230(1)-(N)). Because object storage does not permit partial updates to an object, a read or write operation requires an entire object to be read (or written to) each time there is an update.

Under traditional data replication and data recovery systems, update sets (e.g., update sets 205(1)-(5)) are applied in real-time to object storage. This results in significantly higher I/O costs (although storage costs are low). Therefore, as noted above, I/O consolidation can be used to reduce the I/O costs. For example, I/O consolidation can be performed by target replication engine 196 at certain intervals of time so that multiple accumulated I/Os (e.g., consolidated I/Os 235) can be processed at the same time. In addition, because object storage does not have a limit on the size of PUT requests, multiple I/Os to a specific region (e.g., object 230(3)) can be served by a single PUT request, as shown in FIG. 2B.

In some embodiments, applier-periodicity is used to perform I/O consolidation over time. Applier-periodicity refers to the amount of time after which consolidated I/Os are serviced. For example, if applier-periodicity is 4 hours, update sets generated during this time frame remain unapplied. Once I/O applier 199 is triggered, I/O applier 199 identifies all objects that have changed, and for each object that has changed, I/O applier 199 GET(s) a copy of that object (e.g., object 230(3)), updates the object with all writes across all update sets which correspond to that particular object (e.g., update sets 205(1)-(N)), and PUT(s) the object to the object store (e.g., virtual disk 227 as shown in object view 225). In this manner, the total number of GET and PUT requests remain bounded because a PUT request is processed for a changed object only once every 4 hours. Therefore, because PUT requests are no longer a valid function of the number of I/Os performed on virtual disk(s), the storage cost associated with object storage now only depends on the number of changed (or modified) objects (e.g., based on block randomness, which refers to the percent of total objects that have changed or that have been modified in the applier-periodicity time frame).

Figure 2C:
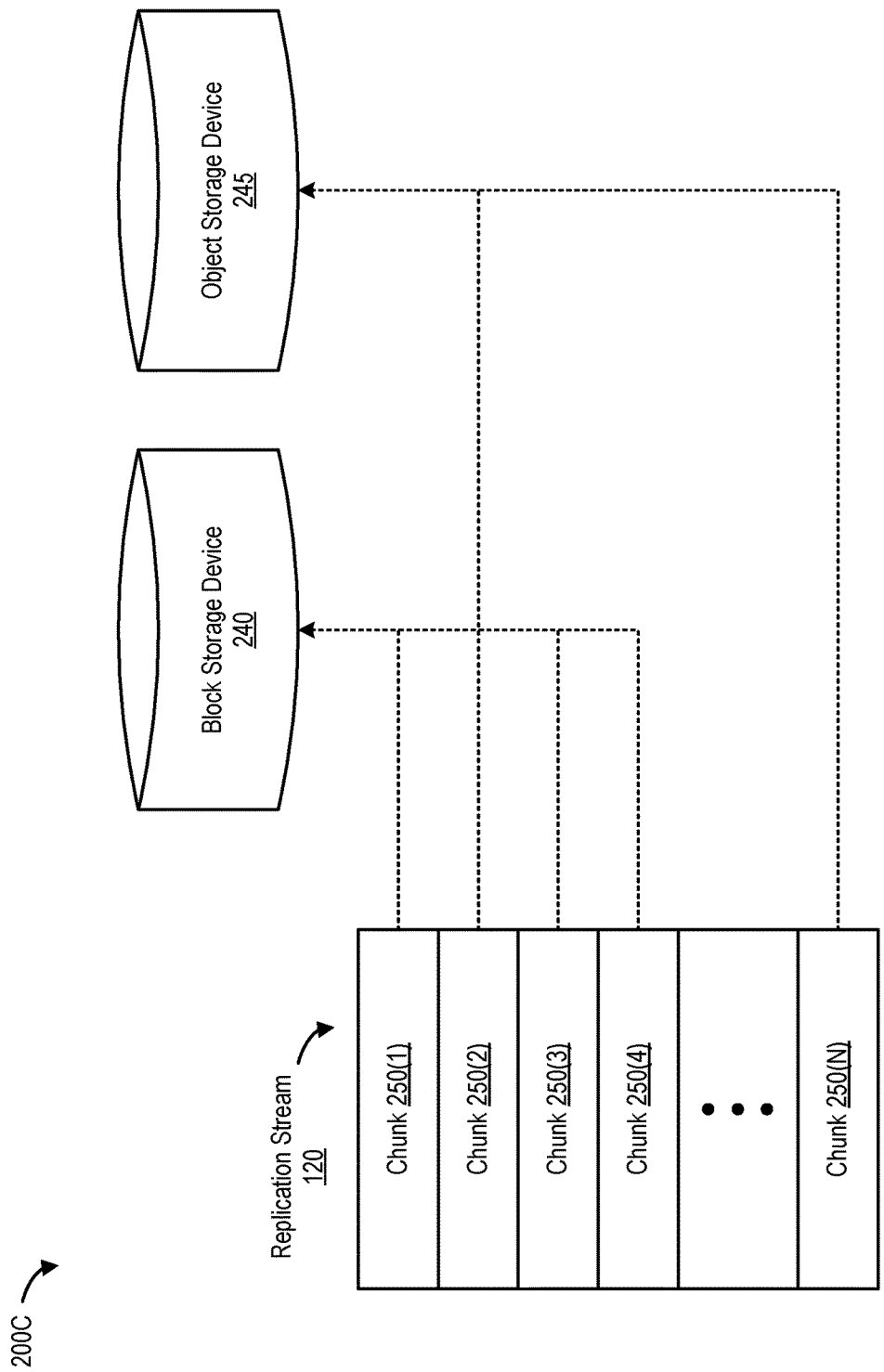
FIG. 2C is a block diagram of a replication stream, according to one embodiment of the present disclosure.

FIG. 2C is a block diagram of a block storage device, according to one embodiment. In certain embodiments, replication stream 120 can be broken up (or divided) into multiple chunks (e.g., chunks 250(1)-(N)). Each chunk can be stored in either block storage device 240 or in object storage device 245. It should be noted that storage tiers available on block storage device 240 and/or on object storage device 245 can include multiple storage types (e.g., SSD, HDD, and the like), storage systems (e.g., file storage systems, and the like), and storage devices (e.g., block storage devices, object storage devices, and the like). In this example, replication stream 120 is received by target replication appliance 135, and the storage tiers available on block storage device 240 and/or on object storage device 245 are associated with target replication appliance 135 (e.g., as shown in FIGS. 1A and 1B). Target replication appliance 135 can also send reconfiguration instructions to source replication appliance 115 after storing various chunks in various storage tiers available on block storage device 240 and/or on object storage device 245 (e.g., to replicate data to at least one of the (available) storage tiers other than a pre-selected and/or pre-configured storage tier).

In some embodiments, source replication engine 187 and/or target replication engine 196 stores a first portion of replication stream 120 (e.g., replication update 205(1)) to a first storage tier (other than a pre-selected and/or pre-configured storage tier), and stores a second portion of replication stream 120 (e.g., replication update 205(7)) to a second storage tier (other than a pre-selected and/or pre-configured storage tier). In this example, some I/O characteristics associated with the replication stream 120 include an I/O rate, a size of an I/O, and/or a locality of reference. It should be noted that the storage tiers include (and are implemented on) block storage device 240 and object storage device 245, and that several additional I/O characteristics other than the ones listed above are contemplated.

In certain embodiments, a Service Level Agreement (SLA) is associated with replication stream 120. An SLA can include one or more constraints that are applicable to replication stream 120, for example, including but not limited to, a Recovery Point Objective (RPO) and a Recovery Time Objective (RTO) associated with replication stream 120. As previously noted, storage characteristics and I/O characteristics are not exclusive of one another (but can be), and applier-periodicity and block-randomness can be used to leverage differences between storage tiers. Therefore, in some embodiments, source replication engine 187 and/or target replication engine 196 can determine whether the RPO and/or the RTO associated with replication stream 120 require the storing of one or more portions in the first storage tier (other than a pre-selected and/or pre-configured storage tier), even if the storage cost associated with the first storage tier is higher than the storage cost of the pre-selected and/or pre-configured storage tier. In this manner, constraints in an SLA can impact and even negatively affect the eventual storing of portions of replication 120 to one or more storage tiers.

To counteract the limiting nature of the constraints described above, values for applier-periodicity and/or block-randomness can be modified (or changed) based on a threshold to ensure that both requirements in an SLA as well as storage cost considerations are fulfilled. For example, if applier-periodicity increases, the I/O cost decreases, but the RTO increases, whereas if block-randomness increases, the I/O cost increases, and the RTO also increases. Therefore, as an example, a sample function that considers both storage cost, I/O cost, as well as the RTO can be (Storage Tier, Cost)=f (I/O Cost, Storage Cost, Block-Randomness, RTO) based on the fact that the RTO involves the time required to apply unapplied update sets and the time required to convert block-objects in object storage into a block storage volume. In this manner, threshold values for applier-periodicity and/or block-randomness can be calculated to ensure that both the RTO (constraints) as well as cost considerations (goals) are met.

Examples of I/O Characteristics, Storage Characteristics, and Constraints

FIG. 3 is a replication management table, according to one embodiment. Replication management table 305 can be implemented by source replication engine 187 and/or target replication engine 196, and can be stored as part of source configuration database 177 and/or target configuration database 192, respectively. As previously noted, a given replication stream has one or more I/O characteristics, and a given storage tier has one or more storage characteristics. Also as previously noted, storage characteristics and I/O characteristics are not exclusive of one another, but in some embodiments, can be.

The selection of an appropriate storage tier for one or more portions of replication stream 120 involves accessing, collecting, and analyzing one or more I/O characteristics associated with replication stream 120. Such determinations can be made, for example, at/by source replication appliance 115 and/or target replication appliance 135, or alternatively, by another computing system associated therewith. For example, as shown in FIG. 3, a replication stream 120(1) can have an I/O rate of 10 mb/s, an I/O size of 1 mb, and a locality of reference that points to object 230(1). The pre-selected and/or pre-configured storage tier for replication stream 120(1) is storage tier 155(1). Storage tier 155(1) incurs a "high" cost while offering "high" performance. Therefore, I/O applier 199 applies replication updates that are part of replication stream 120(1) to storage tier 155(2) because storage tier 155(2) provides a lower (storage) cost while offering a satisfactory level of (storage) performance Storage tier 155(2) also satisfies one or more constrains, for example, in an SLA.

In certain embodiments, parameters that can be used to calculate (or determine) values based on I/O characteristics and/or storage characteristics for use with a given gateway (e.g., source replication appliance 115 or target replication appliance 135) include, but are not limited to—an average I/O rate per computing device (e.g., virtual machine 105(1)); the total number of configured computing devices (e.g., virtual machines 105(1)-(N)); the maximum number of computing devices supported (e.g., by source replication appliance 115); memory requirements (e.g., for source replication appliance 115 or target replication appliance 135); required virtual CPUs on source replication appliance 115, storage requirements (e.g., available to target replication appliance 135); a LAN bandwidth (e.g., between virtual machines 105(1)-(N) and source replication appliance 115, currently and/or historically); a write cancellation ratio; an on premise storage throughput; a compression ratio; a WAN bandwidth (e.g., between source replication appliance 115 and target replication appliance 135); cloud volume I/O throughput; and an RPO. For example, if virtual machines 105(1)-(N) have a given average I/O rate (e.g., 15 mb/s), the maximum number of virtual machines supported can depend on the maximum data on the LAN and the I/O rate per virtual machine, and can be constrained by the number of disks that can be attached to target replication appliance 135 (e.g., at least one disk (apart from a boot disk) may be required for staging update sets, and therefore, a given appliance (or gateway) may only be able to support a given number of virtual machines).

In the above example, the recommended memory for storage tier selection can depend on the actual data (e.g., replication streams 120(1)-(N)) on the LAN (e.g., between virtual machines 105(1) and source replication appliance 115), as well as the replication interval (e.g., applier-periodicity). For instance, a certain amount of storage may be required for OS and appliance/gateway daemons, increased memory (compared to the I/O rate) may be required, and data may need to be held for the duration of the replication interval in a read cache. Other parameters such as the required number of virtual CPUs can depend on the actual data on the LAN. For example, one virtual CPU may be required for basic operation and another virtual CPU may be required to process a given I/O rate (e.g., 20 mb/s). In addition, a minimum amount of storage capacity may be needed by source replication appliance 115 or target replication appliance 135, and source replication appliance 115 or target replication appliance 135 can be configured to rectify occasional network disconnects (e.g., assuming a given buffer factor).

As noted above, the foregoing parameters can be used to provision a given gateway (e.g., source replication appliance 115 or target replication appliance 135) based on calculating (or determining) values for I/O characteristics and/or storage characteristics for use with that given gateway. In certain embodiments, a data center (e.g., the computing system shown in FIGS. 1A, 1B, and/or 2B), can be modeled based on such parameters. For instance, such data center modeling parameters (and corresponding example values and example dependencies) can include, but are not limited to—the number of virtual machines (e.g., virtual machines 105(1)-(80)); an average I/O rate from virtual machines (e.g., 1.185 mb/s); the maximum number of disks attached to each cloud gateway (e.g., 4 storage systems for target replication appliance 135); a required WAN bandwidth (e.g., 40 mb/s), which can depend on the number of virtual machines and the I/O rate (although, in some embodiments, WAN and LAN bandwidths may not be considered limiting factors); maximum number of protected virtual machines per gateway/appliance (e.g., 30), which can depend on the maximum number of disks attached as well as the number of disks per virtual machine; the number of gateways/appliances (e.g., 3), which can depend on the number of virtual machines per gateway/appliance; the required memory for each gateway/appliance (e.g., 11 GB), which can depend on the data rate on the LAN as well as the replication interval; the number of virtual CPUs on each gateway/appliance (e.g., 3), which can depend on the data rate on the LAN, and the required storage for each gateway/appliance (e.g., 720 GB), which can depend on the data rate on the LAN, the write cancellation ratio, and the number of virtual machines per gateway/appliance.

Therefore, storage characteristics and I/O characteristics may or may not be exclusive of one another, and can include one or more of the parameters described above (in addition to one or more additional parameters). It will be appreciated that in addition to I/O rate, I/O size, and locality of reference, several other I/O characteristics and/or storage characteristics can be used to calculate (or determine) the storage cost of a given storage tier. Storage tier selection can then be performed after all the necessary parameters are considered and evaluated to ensure that goals related to storage costs as well as constraints imposed by an SLA (or other requirements as described above) are met. For example, in certain embodiments, whether a given portion of replication stream 120 (e.g., replication update 205(1) of update set 205(1)) can be stored in a given storage tier (other than a pre-configured or pre-determined storage tier) can be based on the number of storage systems available to target replication appliance 135, the data size on the LAN, and an I/O rate of each virtual machine. The storage cost of replicating another portion of a replication stream received from virtual machine 105(1) to the given storage tier can be calculated based on an average I/O rate of virtual machines 105(1)-(N)).

Examples of Storage Tier Selection Based on Storage Cost

Figure 3B:
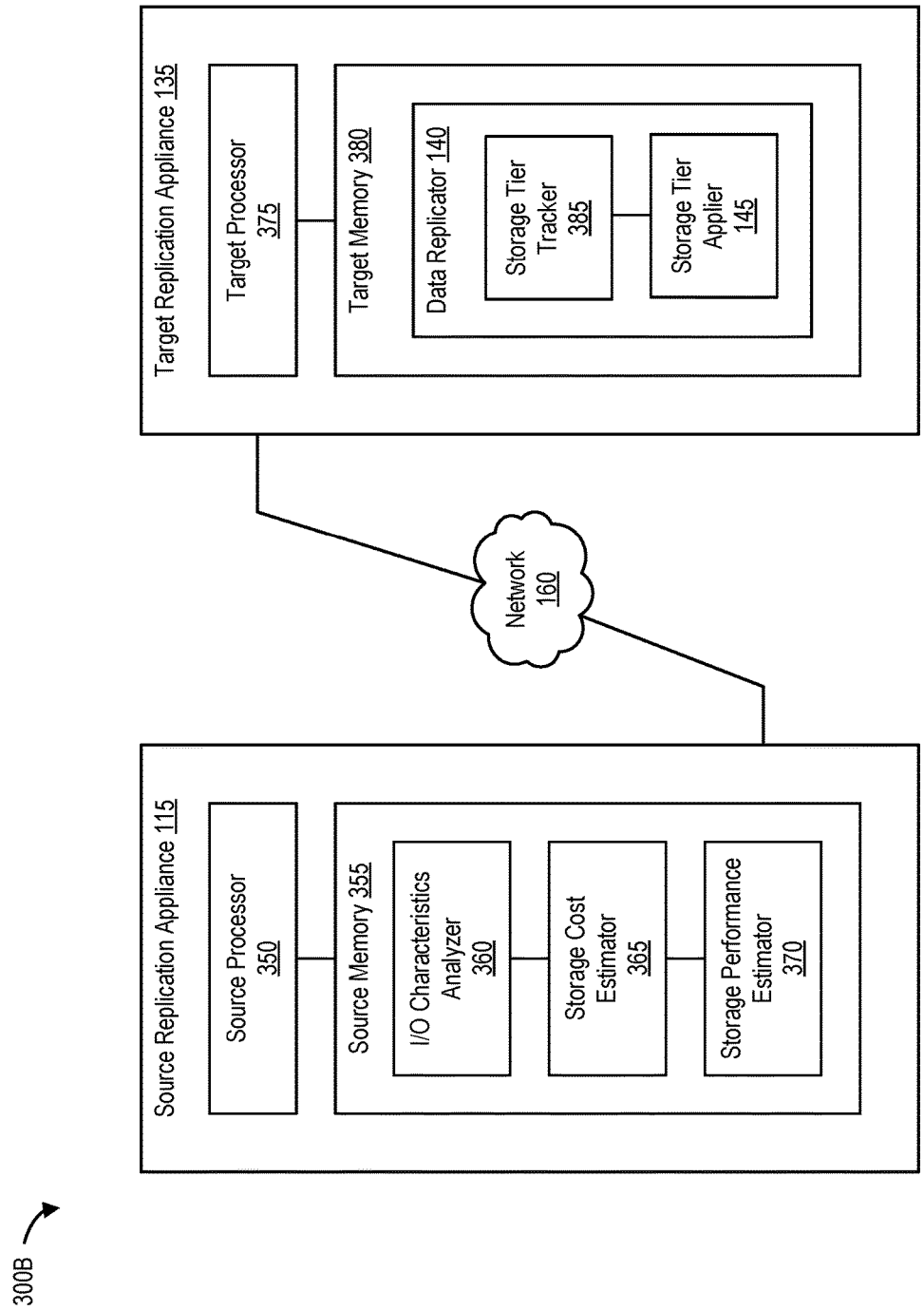
FIG. 3B is a block diagram of a source replication appliance and a target replication appliance, according to one embodiment of the present disclosure.

FIG. 3B is a block diagram of a source replication appliance and a target replication appliance, according to one embodiment. As shown in FIG. 3B, source replication appliance 115 includes a source processor 350 and a source memory 355. Source memory 355 implements an I/O characteristics analyzer 360, a storage cost estimator 365, and a storage performance estimator 370. In one embodiment, I/O characteristics analyzer 360 receives (e.g., in the form of a replication stream) and analyzes I/Os tracked by I/O tracker 170 (e.g., from virtual machine 105(1)). I/O characteristics analyzer 360 then identifies one or more I/O characteristics associated with the replication stream (e.g., I/O rate, I/O size, locality of reference, and the like). Storage performance estimator 370 determines the storage performance of each available storage tier (e.g., whether the storage tier is object storage, block storage, an SSD, a HDD, and the like). Storage cost estimator 365 then calculates the storage cost of storing a given portion of a replication stream to a particular storage tier based on the storage performance of that storage tier and the I/O characteristics of the given portion in the (received) replication stream.

As shown in FIG. 3B, target replication appliance 135 includes a target processor 375 and a target memory 380. Target memory 380 implements a data replicator 140 (e.g., target replication engine 196). Data replicator 140 includes a storage tier tracker 385 and a storage tier applier 145. Storage tier applier 145 stores (or replicates) one or more portions of a replication stream to one or more storage tiers, for example, based on the storage cost (e.g., determined by storage cost estimator 365) associated with storing or replicating those one or more portions to each of the one or more storage tiers (other than a pre-determined or pre-configured storage tier). Storage tier tracker 385 maintains information or metadata related to the portions replicated to or stored in each storage tier.

In certain embodiments, storage tier tracker 385 can also send a notification or confirmation to source replication appliance 115 with the location of each portion as well as the identity of the storage tier on which that portion is stored. This information can enable source replication appliance 115 to migrate the (target) storage tier to a different tier.

Processes to Select Storage Tiers Based on Storage Cost

Figure 4A:
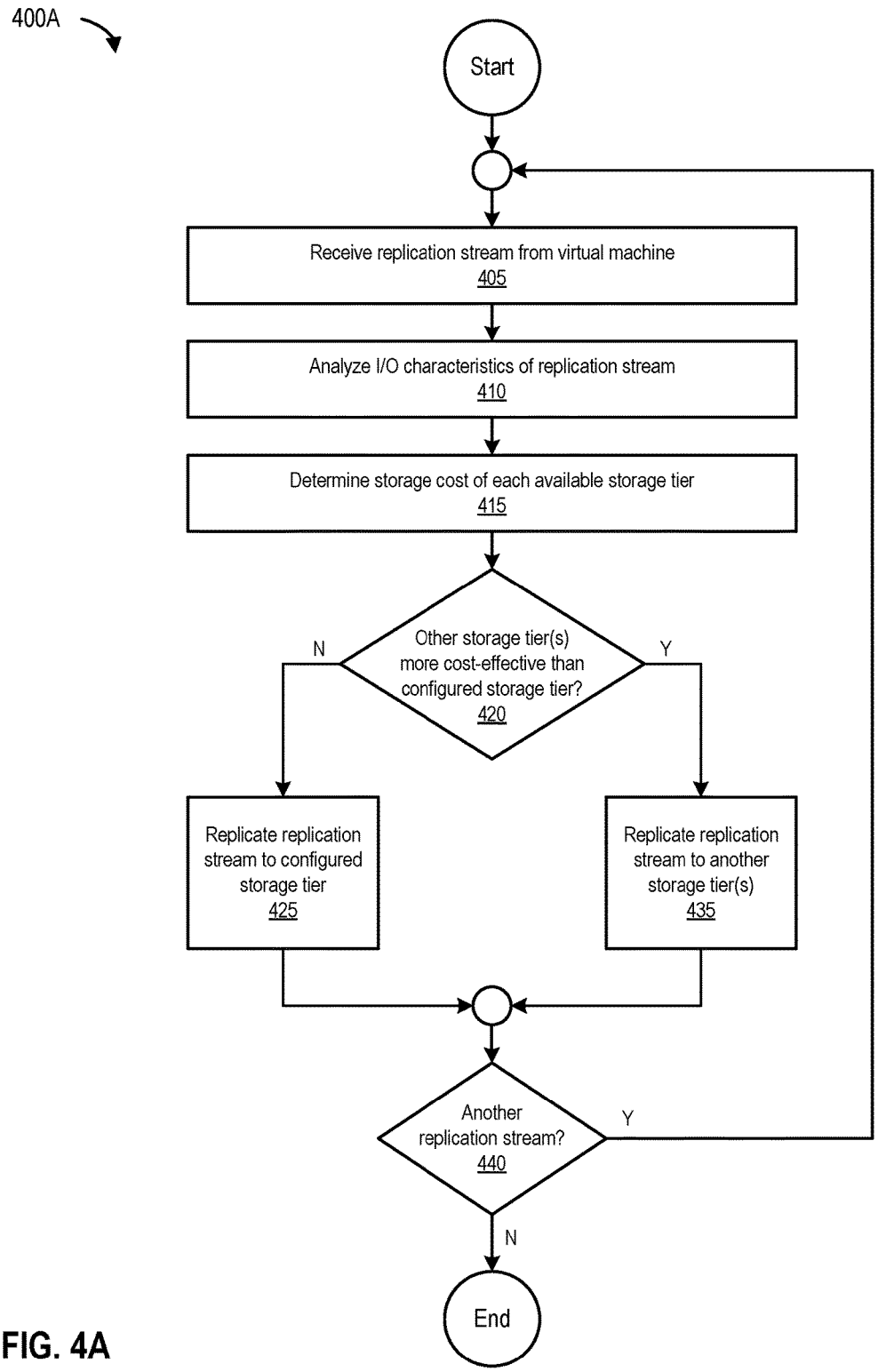
FIG. 4A is a flowchart that illustrates a process for replicating data to a specific storage tier, according to one embodiment of the present disclosure.

FIG. 4A is a flowchart that illustrates an example of a process for replicating data to a specific storage tier, according to one embodiment. The process begins at 405 by receiving a replication stream (e.g., replication stream 120) from a virtual machine (e.g., virtual machine 105(1)). At 410, the process analyzes the I/O characteristics of the replication stream (e.g., using I/O characteristics analyzer 360). At 415, the process determines the storage cost of each available storage tier (e.g., using storage cost estimator 365).

At 420, the process determines whether other storage tier(s) are more cost-effective than a configured storage tier (e.g., a pre-determined or pre-configured storage tier). If other storage tier(s) are not more cost-effective than the configured storage tier, the process, at 425, replicates (or stores) the replication stream (or one or more portions thereof) to the configured storage tier. However, if other storage tier(s) are more cost-effective than the configured storage tier, the process, at 430, replicates (or stores) the replication stream (or one or more portions thereof) to another storage tier(s). The process ends at 440 by determining if there is another replication stream to be processed.

Figure 4B:
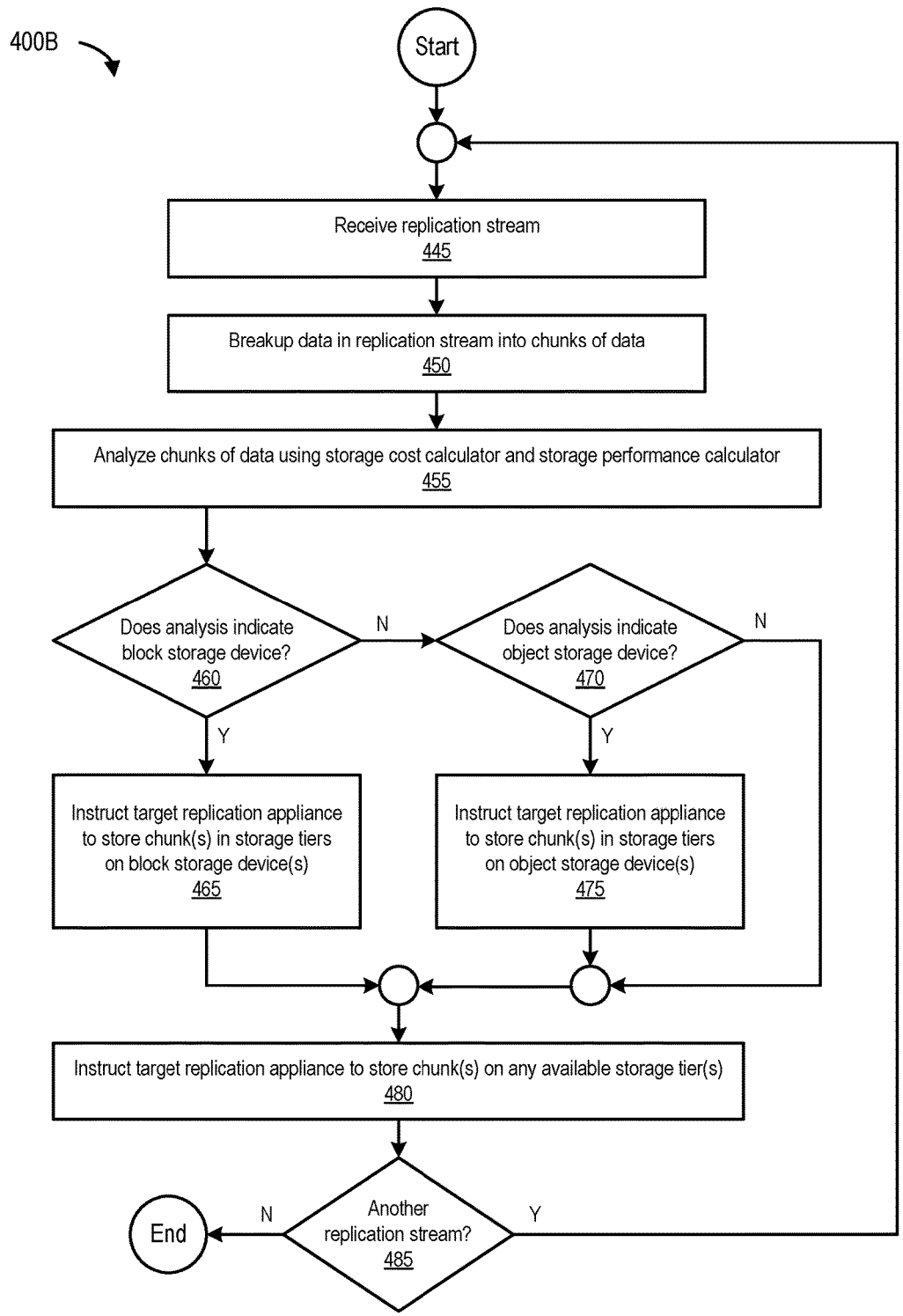
FIG. 4B is a flowchart that illustrates a process for storing portions of a replication stream to different storage devices, according to one embodiment of the present disclosure.

FIG. 4B is a flowchart that illustrates an example of a process for storing portions of a replication stream to different storage devices, according to one embodiment. The process begins at 445 by receiving a replication stream (e.g., from virtual machine 105(1)). At 450, the process breaks up (or divides) data in the replication stream into chunks of data. At 455, the process analyzes the chunks using storage cost estimator 365 and storage performance estimator 370. At 460, the process determines whether the analysis indicates one or more chunks of data should be stored in a block storage device (e.g., block storage device 240). If the analysis indicates storage in a block storage device, the process, at 465, instructs target replication appliance 135 to store the chunk(s) in storage tiers on block storage device(s) (e.g., chunks 250(1), 250(3), and 250(4) as shown in FIG. 2C). However, if the analysis does not indicate storage in a block storage device, the process, at 470, determines whether the analysis indicates storage of the chunk(s) of data in an object storage device (e.g., object storage device 245). If the analysis indicates storage in a object storage device, target replication appliance 135 stores the chunk(s) in storage tiers on object storage device(s) (e.g., chunks 250(2) and 250(N) as shown in FIG. 2C), at 475. However, if the analysis indicates a block storage device will not be used for storage of the chunk(s) of data in question, the process, at 480, instructs target replication appliance 135 to store chunks on any available storage tier(s) identified as having an acceptable storage cost. The process ends at 485 by determining whether there is another replication stream to be processed.

Figure 5:
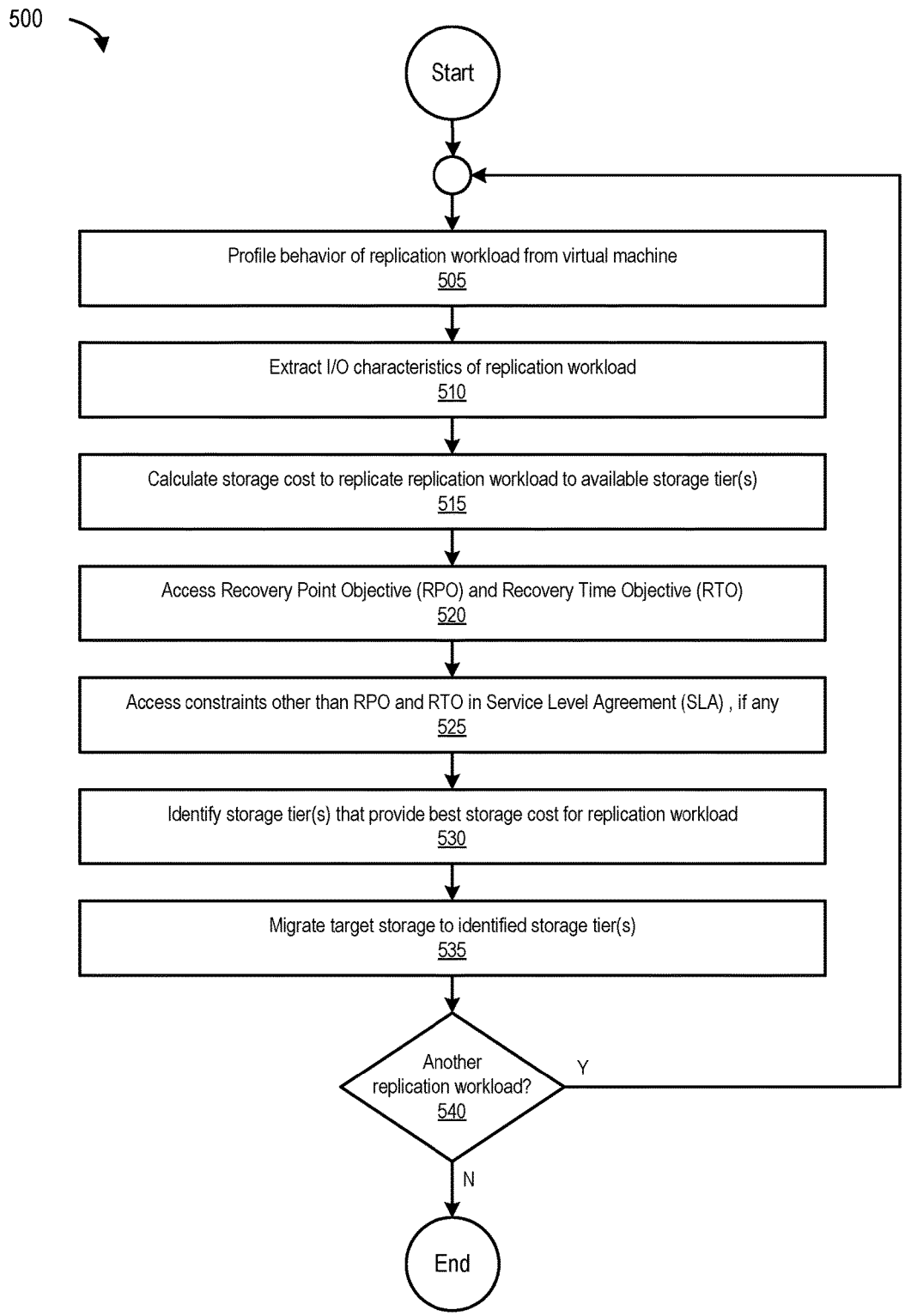
FIG. 5 is a flowchart that illustrates a process for migrating storage to an identified storage tier, according to one embodiment of the present disclosure.

FIG. 5 is a flowchart that illustrates an example of a process for migrating storage to an identified storage tier, according to one embodiment. The process begins at 505 by profiling the behavior of a replication workload from a virtual machine. At 510, the process extracts I/O characteristics of the replication workload. At 515, the process calculates the storage cost to replicate (or store) the replication workload to available storage tier(s) (e.g., based on values derived from parameters related to I/O characteristics, storage characteristics, other dependencies).

At 520, the process accesses an RPO and an RTO associated with the replication workload (e.g., by accessing an SLA). At 525, the process accesses other constraints other than RPO and RTO in the SLA (if any). Based on the previously calculated storage cost and the constraints, the process, at 530, identifies storage tier(s) that provide the best storage cost for the replication workload (and one or more portions thereof). At 535, the process migrates the target storage (e.g., the configured storage tier) to the identified storage tier(s) (that provide the best storage cost for the replication workload). The process ends at 540 by determining if there is another replication workload to be processed.

Figure 6:
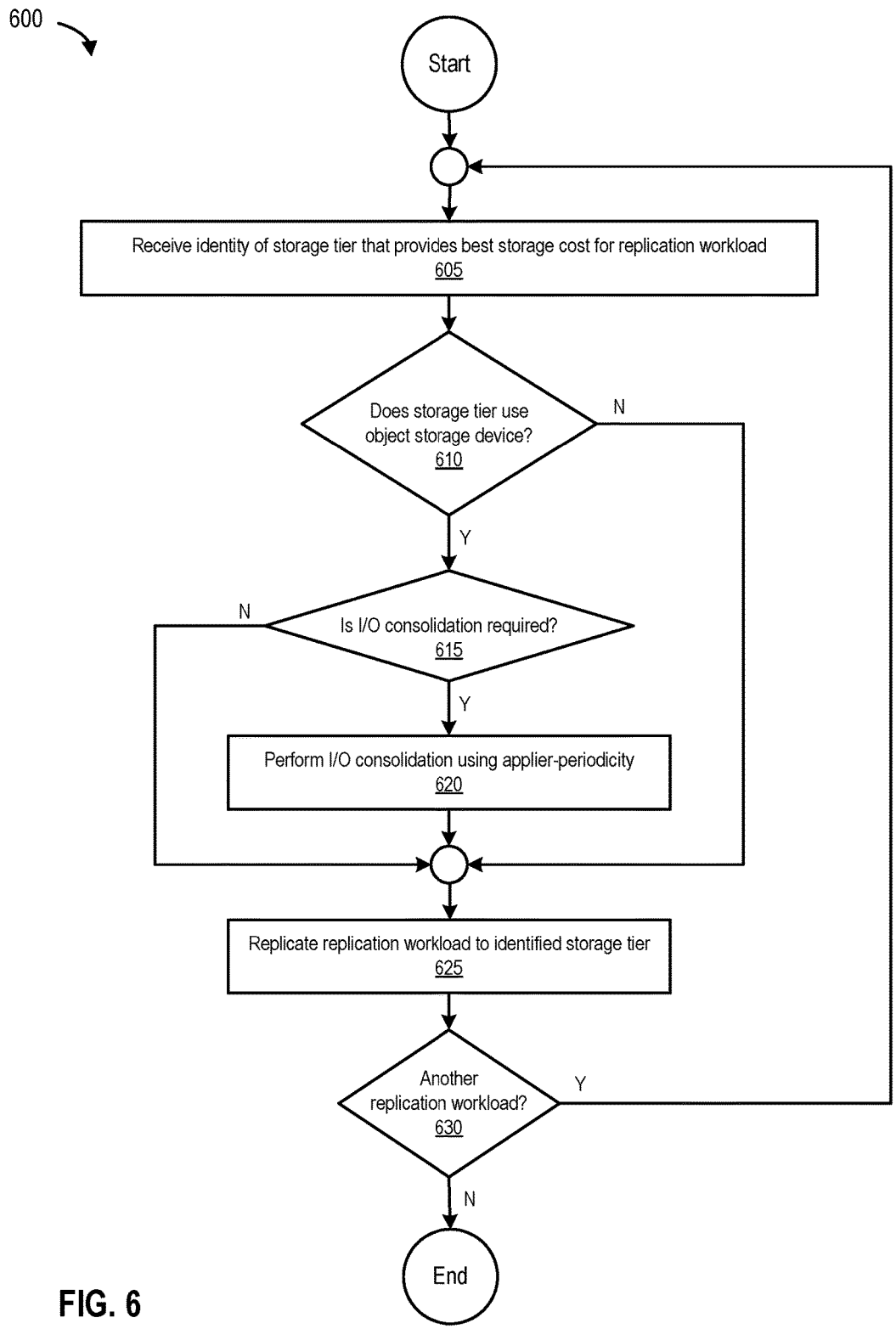
FIG. 6 is a flowchart that illustrates a process for processing data prior to replicating data to an identified storage tier, according to one embodiment of the present disclosure.

FIG. 6 is a flowchart that illustrates an example of a process for processing data prior to replicating data to an identified storage tier, according to one embodiment. The process begins at 605 by receiving the identity of a storage tier that provides the best storage cost for a replication workload. At 610, the process determines whether the (identified) storage tier uses an object storage device. If the (identified) storage tier uses an object storage device, the process, at 615, determines whether I/O consolidation is required (e.g., based on applier-periodicity and block-randomness, as described above). If I/O consolidation is required, the process, at 620, performs I/O consolidation using applier-periodicity. However, if the (identified) storage tier does not use an object storage device, and thus no I/O consolidation is required, the process, at 625, replicates (or stores) the replication workload to the (identified) storage tier. The process ends at 630 by determining if there is another replication workload to be processed.

Figure 7:
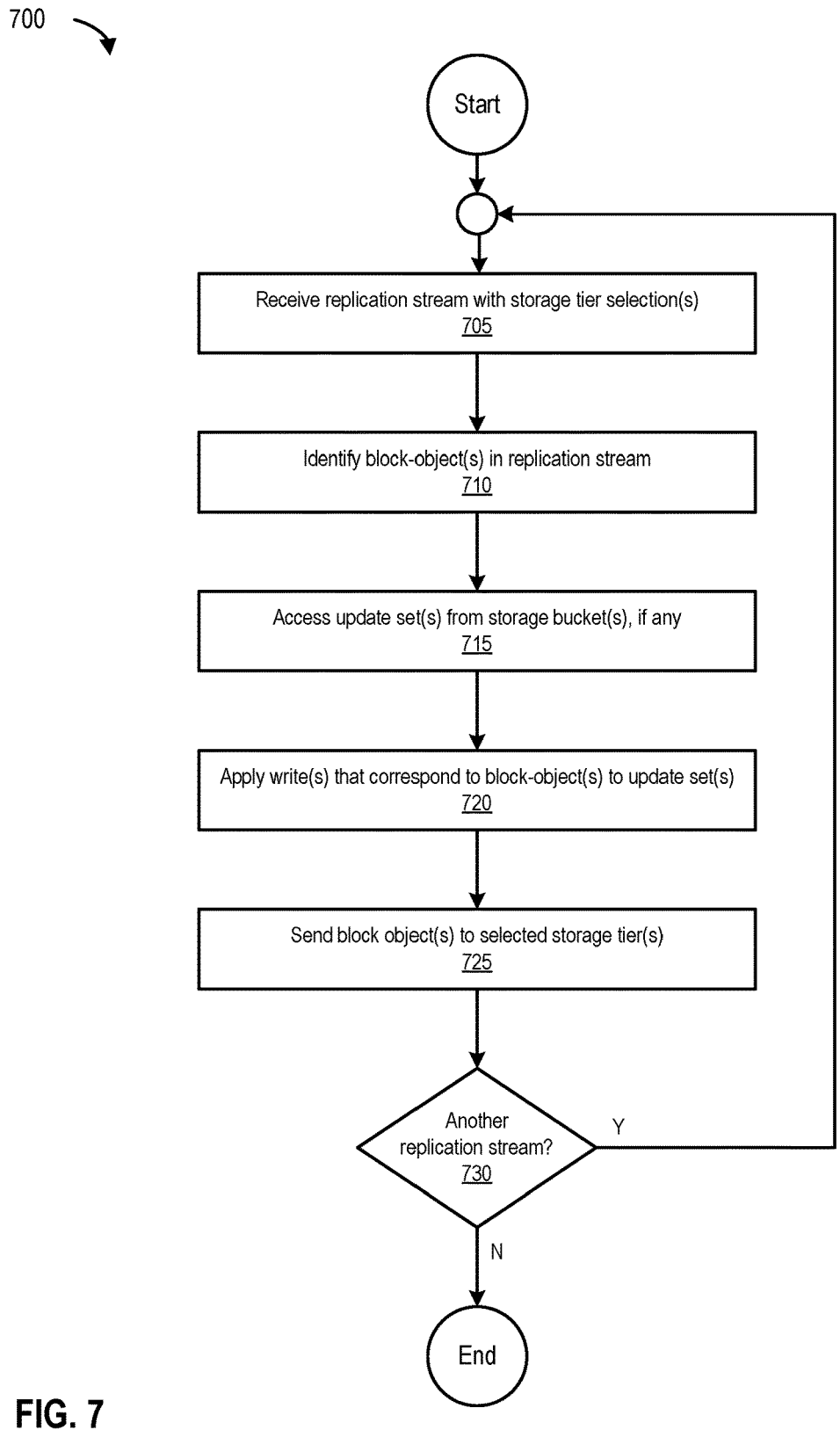
FIG. 7 is a flowchart that illustrates a process for updating a replication stream prior to storing data to a specific storage tier, according to one embodiment of the present disclosure.

FIG. 7 is a flowchart that illustrates a process for updating a replication stream prior to storing data to a specific storage tier, according to one embodiment. The process begins at 705 by receiving a replication stream with storage tier selection(s) (e.g., from source replication appliance 115). At 710, the process identifies block-objects in the replication stream. At 715, the process accesses update set(s) from storage bucket(s), if any (e.g., update sets 205(1)-(5) from object storage bucket 220 as shown in FIG. 2B). At 720, the process applies write(s) that correspond to the block-object (s) to the update set(s). At 725, the process sends the block-object(s) to the selected storage tier(s). The process ends at 730 by determining if there is another replication stream to be processed.

It will be appreciated that the methods, systems, and processes disclosed and described herein leverage storage characteristics of storage tiers as well as characteristics of a replication stream, to reduce (or minimize) the cost of data replication and data recovery in cloud environments. It will also be appreciated that these methods, systems, and processes can also leverage differences between storage tiers provided by various cloud vendors to reduce the cost of data replication and data recovery operations.

An Example Computing Environment

Figure 8:
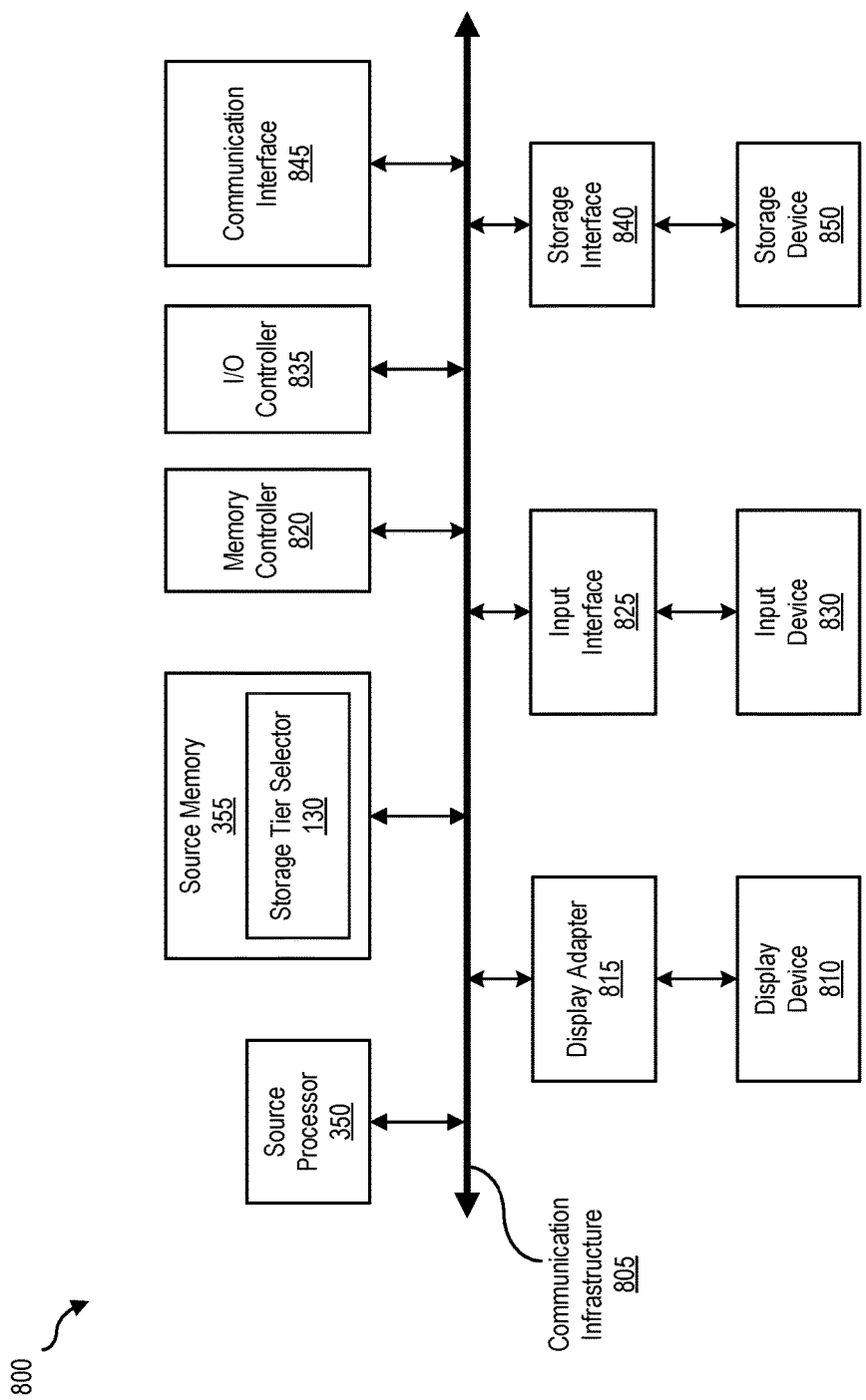
FIG. 8 is a block diagram of a computing system, illustrating how a storage tier selector can be implemented in software, according to one embodiment of the present disclosure.

FIG. 8 is a block diagram of a computing system, illustrating how a storage tier selector can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one source processor 350 and a source memory 355. By executing the software that implements source replication appliance 115, computing system 800 becomes a special purpose computing device that is configured to perform data tier selection for replication and recovery.

Source processor 350 generally represents any type or form of processing unit capable of processing data or interpreting and executing instructions. In certain embodiments, source processor 350 may receive instructions from a software application or module. These instructions may cause source processor 350 to perform the functions of one or more of the embodiments described and/or illustrated herein. For example, source processor 350 may perform and/or be a means for performing all or some of the operations described herein. Source processor 350 may also perform and/or be a means for performing any other operations, methods, or processes described and/or illustrated herein.

Source Memory 355 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an orchestrator module may be loaded into source memory 355.

In certain embodiments, computing system 800 may also include one or more components or elements in addition to source processor 350 and/or source memory 355. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a virtual machine, an appliance, a gateway, and/or a computing device. For example, in certain embodiments I/O controller 835 may control or facilitate transfer of data between one or more elements of computing system 800, such as source processor 350, source memory 355, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in source memory 355 and/or various portions of storage device 850. When executed by source processor 350, a computer program loaded into computing system 800 may cause source processor 350 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
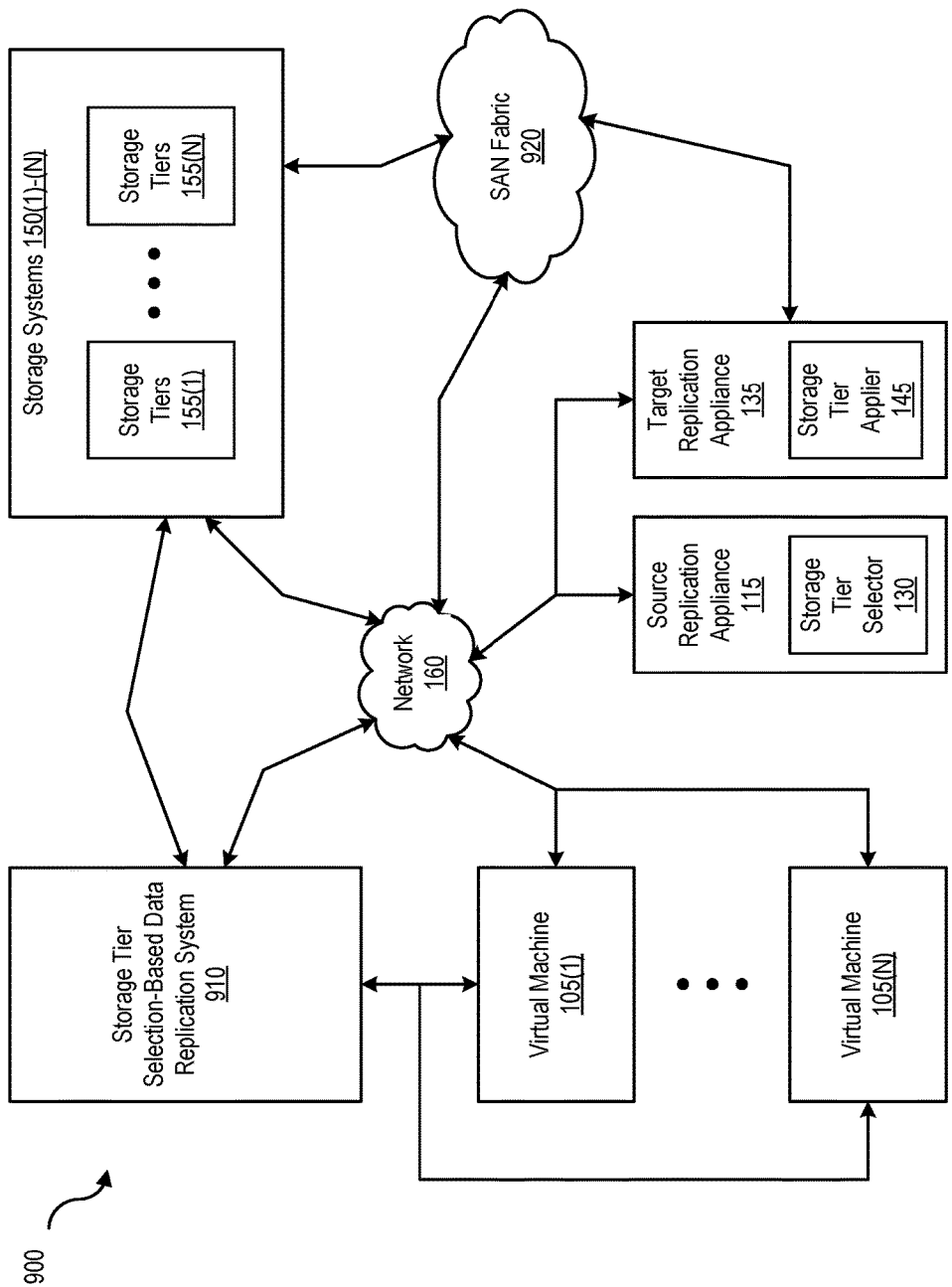
FIG. 9 is a block diagram of a networked system, illustrating how various devices can communicate via a network, according to one embodiment of the present disclosure.

FIG. 9 is a block diagram of a networked system, illustrating how various devices can communicate via a network, according to one embodiment. In certain embodiments, network-attached storage (NAS) devices may be configured to communicate with source replication appliance 115 and/or target replication appliance 135 using various protocols, such as Network File System (NFS), Server Message Block (SMB), or Common Internet File System (CIFS). Network 160 generally represents any type or form of computer network or architecture capable of facilitating communication between virtual machines 105(1)-(N) and source replication appliance 115 and/or target replication appliance 135.

In certain embodiments, a communication interface, such as communication interface 845 in FIG. 8, may be used to provide connectivity between virtual machines 105(1)-(N) and source replication appliance 115 and/or target replication appliance 135, and network 160. It should be noted that the embodiments described and/or illustrated herein are not limited to the Internet or any particular network-based environment. For example, network 160 can be a Storage Area Network (SAN).

In one embodiment, all or a portion of one or more of the disclosed embodiments may be encoded as a computer program and loaded onto and executed by source replication appliance 115, target replication appliance 135, or any combination thereof. All or a portion of one or more of the embodiments disclosed herein may also be encoded as a computer program, stored on source replication appliance 115 and/or target replication appliance 135, and distributed over network 160. In some examples, all or a portion of source replication appliance 115 and/or target replication appliance 135 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, storage tier selector 130 and storage tier applier 145 may transform the behavior of source replication appliance 115 and/or target replication appliance 135 in order to cause source replication appliance 115 and/or target replication appliance 135 to perform storage tier selection for data replication and data recovery purposes.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method comprising:
   receiving a replication stream at a source replication appliance, wherein
      the source replication appliance is configured to replicate data to a storage tier of a plurality of storage tiers, and
      each storage tier of the plurality of storage tiers differs from at least one other of the plurality of storage tiers in at least one storage characteristic of a plurality of storage characteristics;
   identifying one or more portions of the replication stream based on one or more input/output (I/O) characteristics of the one or more portions of the replication stream; and
   transmitting a command to store at least one portion of the one or more portions in one of the plurality of storage tiers other than the storage tier, wherein
      the at least one portion of the one or more portions is to be stored in the one of the plurality of storage tiers based, at least in part, on the one or more I/O characteristics of the at least one portion, storage type information, and a storage cost associated with the each storage tier of the plurality of storage tiers,
      the storage cost associated with the each storage tier is based on one or more storage characteristics of the plurality of storage characteristics of the each storage tier, and the storage type information indicates that at least one of the plurality of storage tiers is implemented on a block storage device of one or more block storage device and at least another of the plurality of storage tiers is implemented on an object storage device of one or more object storage devices.

2. The computer-implemented method of claim 1, wherein
the plurality of storage tiers comprise a plurality of storage types, a plurality of storage systems, or a plurality of storage devices.

3. The computer-implemented method of claim 1, wherein
the replication stream is received by a target replication appliance, and
the plurality of storage tiers are associated with the target replication appliance.

4. The computer-implemented method of claim 1, further comprising:
sending reconfiguration instructions to the source replication appliance to replicate data to at least one of the plurality of storage tiers other than the storage tier.

5. The computer-implemented method of claim 1, further comprising:
storing a first portion of the replication stream to a first storage tier of the plurality of storage tiers other than the storage tier, and
storing a second portion of the replication stream to a second storage tier of the plurality of storage tiers other than the storage tier.

6. The computer-implemented method of claim 1, wherein
the one or more I/O characteristics associated with the replication stream comprise, at least in part, one or more of an I/O rate, a size of an I/O, or a locality of reference.

7. The computer-implemented method of claim 1, wherein
the plurality of storage tiers comprise one or more block storage devices and one or more object storage devices.

8. The computer-implemented method of claim 1 wherein,
a Service Level Agreement (SLA) associated with the replication stream,
the SLA comprises a plurality of constraints, and
the plurality of constraints comprise at least in part, a Recovery Point Objective (RPO) and a Recovery Time Objective (RTO) associated with the replication stream.

9. The computer-implemented method of claim 8, further comprising:
determining whether the RPO and the RTO require storing of the at least one portion of the one or more portions in a first one of the plurality of storage tiers other than the storage tier even if the storage cost associated with the first one of the plurality of storage tiers is higher than the storage cost of the storage tier.

10. The computer-implemented method of claim 1, further comprising:
determining whether a virtual machine of a plurality of virtual machines can be supported by the each storage tier of the plurality of storage tiers, wherein
the determining is based on a number of disks that can be coupled to a cloud gateway, a maximum data size on a Local Area Network (LAN), and an I/O rate of each virtual machine of the plurality of virtual machines; and calculating a storage cost of replicating another replication stream received from the virtual machine based on an average I/O rate of the plurality of virtual machines.

11. A non-transitory computer-readable storage medium storing program instructions executable to:
receive a replication stream at a source replication appliance, wherein
the source replication appliance is configured to replicate data to a storage tier of a plurality of storage tiers, and
each storage tier of the plurality of storage tiers differs from at least one other of the plurality of storage tiers in at least one storage characteristic of a plurality of storage characteristics;
identify one or more portions of the replication stream based on one or more input/output (I/O) characteristics of the one or more portions of the replication stream; and
transmit a command to store at least one portion of the one or more portions in one of the plurality of storage tiers other than the storage tier, wherein
the at least one portion of the one or more portions is to be stored in the one of the plurality of storage tiers based, at least in part, on the one or more I/O characteristics of the at least one portion, storage type information, and a storage cost associated with the each storage tier of the plurality of storage tiers,
the storage cost associated with the each storage tier is based on one or more storage characteristics of the plurality of storage characteristics of the each storage tier, and
the storage type information indicates that at least one of the plurality of storage tiers is implemented on a block storage device of one or more block storage device and at least another of the plurality of storage tiers is implemented on an object storage device of one or more object storage devices.

12. The non-transitory computer-readable storage medium of claim 11, wherein
the plurality of storage tiers comprise a plurality of storage types, a plurality of storage systems, or a plurality of storage devices,
the replication stream is received by a target replication appliance, and
the plurality of storage tiers are associated with the target replication appliance.

13. The non-transitory computer-readable storage medium of claim 11, further comprising:
sending reconfiguration instructions to the source replication appliance to replicate data to at least one of the plurality of storage tiers other than the storage tier;
storing a first portion of the replication stream to a first storage tier of the plurality of storage tiers other than the storage tier; and
storing a second portion of the replication stream to a second storage tier of the plurality of storage tiers other than the storage tier.

14. The non-transitory computer-readable storage medium of claim 11, wherein
the one or more I/O characteristics associated with the replication stream comprise, at least in part,
one or more of an I/O rate,
a size of an I/O, or
a locality of reference, and
the plurality of storage tiers comprise one or more block storage devices and one or more object storage devices.

15. The non-transitory computer-readable storage medium of claim 11, wherein
a Service Level Agreement (SLA) associated with the replication stream,
the SLA comprises a plurality of constraints, and
the plurality of constraints comprise at least in part,
a Recovery Point Objective (RPO) and a Recovery Time Objective (RTO) associated with the replication stream.

16. A system comprising:
one or more processors; and
a memory coupled to the one or more processors, wherein the memory stores program instructions executable by the one or more processors to:
receive a replication stream at a source replication appliance, wherein
the source replication appliance is configured to replicate data to a storage tier of a plurality of storage tiers, and
each storage tier of the plurality of storage tiers differs from at least one other of the plurality of storage tiers in at least one storage characteristic of a plurality of storage characteristics;
identify one or more portions of the replication stream based on one or more input/output (I/O) characteristics of the one or more portions of the replication stream; and
transmit a command to store at least one portion of the one or more portions in one of the plurality of storage tiers other than the storage tier, wherein
the at least one portion of the one or more portions is to be stored in the one of the plurality of storage tiers based, at least in part, on the one or more I/O characteristics of the at least one portion, storage type information, and a storage cost associated with the each storage tier of the plurality of storage tiers,
the storage cost associated with the each storage tier is based on one or more storage characteristics of the plurality of storage characteristics of the each storage tier, and
the storage type information indicates that at least one of the plurality of storage tiers is implemented on a block storage device of one or more block storage device and at least another of the plurality of storage tiers is implemented on an object storage device of one or more object storage devices.

17. The system of claim 16, wherein
the plurality of storage tiers comprise
a plurality of storage types,
a plurality of storage systems, or
a plurality of storage devices,
the replication stream is received by a target replication appliance, and
the plurality of storage tiers are associated with the target replication appliance.

18. The system of claim 16, further comprising:
sending reconfiguration instructions to the source replication appliance to replicate data to at least one of the plurality of storage tiers other than the storage tier;
storing a first portion of the replication stream to a first storage tier of the plurality of storage tiers other than the storage tier; and
storing a second portion of the replication stream to a second storage tier of the plurality of storage tiers other than the storage tier.

19. The system of claim 16, wherein
the one or more I/O characteristics associated with the replication stream comprise, at least in part,
one or more of an I/O rate,
a size of an I/O, or
a locality of reference, and
the plurality of storage tiers comprise one or more block storage devices and one or more object storage devices.

20. The system of claim 16, wherein
a Service Level Agreement (SLA) associated with the replication stream,
the SLA comprises a plurality of constraints, and
the plurality of constraints comprise at least in part,
a Recovery Point Objective (RPO) and a Recovery Time Objective (RTO) associated with the replication stream.

21. The computer-implemented method of claim 1, wherein
the command is configured to facilitate a storage tier applier of a target replication appliance to effectuate storage of the at least one portion of the one or more portions in the one of the plurality of storage tiers.

* * * * *